(12) United States Patent
Fujita

(10) Patent No.: US 7,286,266 B2
(45) Date of Patent: Oct. 23, 2007

(54) PRINTER AND IMAGE PROCESSING DEVICE FOR THE SAME

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 932 days.

(21) Appl. No.: 10/616,454

(22) Filed: Jul. 9, 2003

(65) Prior Publication Data
US 2004/0061903 A1     Apr. 1, 2004

(30) Foreign Application Priority Data
Jul. 9, 2002   (JP) .................. P. 2002-200329

(51) Int. Cl.
*H04N 1/405* (2006.01)
*G06K 15/00* (2006.01)

(52) U.S. Cl. .................. 358/3.06; 358/3.1; 358/534

(58) Field of Classification Search .............. 358/3.01, 358/3.02, 3.06, 3.09, 3.12, 3.13, 3.14, 3.15, 358/3.16, 3.17, 3.18, 3.19, 534, 535, 536
See application file for complete search history.

(56) References Cited

U.S. PATENT DOCUMENTS 5,729,663 A * 3/1998 Lin et al. .................. 358/1.9
5,757,976 A * 5/1998 Shu ............................ 382/252

FOREIGN PATENT DOCUMENTS

| JP | 6-253134 | 9/1994 |
| JP | 7-250240 | 9/1995 |
| JP | 11-328357 | 11/1999 |
| JP | 2000-341524 | 12/2000 |

* cited by examiner

*Primary Examiner*—Thomas D. Lee
(74) *Attorney, Agent, or Firm*—Osha Liang LLP

(57) ABSTRACT

A printer is capable of expressing halftones by forming halftone spots in cells each having a plurality of pixels by irradiating an exposure beam. The printer comprises a halftone processing section for converting M-bit image data into N (M>N)-bit drive pulse width data for driving the exposure beam. The halftone processing section includes a threshold matrix including a plurality of threshold values corresponding to the plurality of pixels, and a converter circuit which compares a plurality of threshold values output from the threshold matrix with image data, and generates drive pulse width data in accordance with the comparison result. Random noise is superposed on the plurality of threshold values or the image data, and the resultant is subjected to the comparison, whereby generation of tone jump is suppressed. The halftone processing section further includes pulse position determining means for determining a position of a drive pulse for a pixel under processing in accordance with drive pulse width data of pixels adjacent to the pixel under processing, and a pulse width modulator for generating a drive pulse signal at the determined drive pulse position according to the drive pulse width data.

11 Claims, 9 Drawing Sheets

PRINTER AND IMAGE PROCESSING DEVICE FOR THE SAME

The present application is based on Japanese Patent Application No. 2002-200329, which is incorporated herein by reference.

BACKGROUND OF THE INVENTION

1. Field of the Invention

The present invention relates to a printer which is capable of expressing halftones by halftone spots formed by a multi-value dither method, and an image processing device for performing the processing for the halftone expression.

2. Description of the Related Art

There is proposed a printer, such as an electrophotographic machine, in which halftone spots are formed by the multi-value dither method and halftones are expressed by using the areas of halftone spots. In a method of forming halftone spots by the multi-value dither method, a cell is formed by using a plurality of pixels adjacently arranged. An area of a dot formed within each pixel is determined in accordance with a gradation value of image data of the pixel. As a gradation value of image data increases, a dot within a pixel located at the center of a cell formed with a plurality of pixels is first grown, and then the dots in the pixels located around the center pixel are grown. In this way, the areas of the halftone spots are gradually increased to thereby express halftones. By expressing the dots formed within the pixels in multi-gradation levels, the number of gradation levels is increased even if the number of dots per unit area is small. Further, the halftone spot size is reduced and the number of screen lines is increased, whereby an image plane resolution is increased.

A color laser printer, which utilizes a laser beam, increases its market share in later years. In the color laser printer, a dot area in the pixel corresponds to a pulse width of a drive pulse for a laser beam to be irradiated onto a developing drum. Image data of each pixel is converted into drive pulse width data as image reproduction information by a halftone processing section in a controller. And, the drive pulse width data is converted into a drive pulse signal by a pulse width modulator, and the converted one is output to a print engine.

FIG. 1 is a block diagram showing an overall configuration of a conventional printer system. Character data, graphic data, bit map data and the like are generated by an application program 12 in a host computer 10. Upon receipt of those pieces of data, a printer driver 14 generates image data S14 representative of a gradation level of each pixel. The image data generated is contained in a print job and output to a printer 20.

The printer 20 includes a controller 22 and a print engine 30. The controller 22 interprets a print jot; it extracts the image data S14 and print commands; it stores the image data S14 into an image memory 23; it performs a color conversion of the image data in synchronism with the operation of the print engine 30; it carries out a half one process; and it outputs a drive pulse signal S29 for a laser diode 32 in the print engine. Accordingly, the controller 22 includes a color conversion section 24, a color conversion table 25 for color conversion, a halftone processing section 26, and a halftone table 28 which is referred to in executing the halftone process by the halftone processing section.

In the color conversion section 24, RGB image data is converted into CMYK image data S24. In the halftone processing section 26, 8-bit CMYK image data of each pixel is converted into pulse width data S26 of a drive pulse signal for driving the laser diode, which is used for forming a virtual dot in each of pixels forming a halftone spot capable of expressing the halftone. A pulse width modulation element 29 generates a drive pulse signal S29 by using the drive pulse width data S26. The halftone processing section 26 converts the 8-bit CMYK image data into the 8-bit drive pulse width data S26. Accordingly, the number of gradation levels. In this halftone process, the number of gradation levels (256 gradation levels) of each pixel is not changed.

In the print engine 30, the laser diode 32 generates a laser beam in accordance with a drive pulse signal, and a surface of the color conversion section 24 is scanned with the laser beam. Toner attaches to virtual dots in the pixels irradiated with the laser beam, so that dots are formed within the pixels. Those dots are printed on a printing medium, such as a printing sheet of paper. The developed dots form halftone spots, and halftones are expressed by using the areas of halftone spots.

In the present specification, the term "pixel" is an area to which image data, such as gradation value, is assigned, and the image data halftone processed is also generated corresponding to the pixel. In the print engine, a laser beam is irradiated onto the pixel on the photosensitive drum. The area irradiated with the laser beam is referred to as a "virtual dot". Accordingly, the virtual dot is an area defined by a drive pulse signal for the laser beam. On the photosensitive drum, toner attaches to the virtual dots irradiated with the laser beam to thereby form "dots" formed by the toner. In other words, the dot is an area defined by the toner attached to within the pixel. The toner dots are transferred onto a printing medium, and a "halftone spot" is formed by dots formed by a plurality of pixels, whereby a halftone is expressed. A set of pixels, which form a halftone spot, will be referred to as a "halftone spot cell".

In the case of the color printer, the controller 22 sequentially outputs drive pulse signals S29 for the image data of four colors, C, M, Y and K. The print engine 30 repeats the operations of forming color images of four colors, four times. Toners of four colors which have been transferred to an intermediate transfer medium (not shown) are transferred onto a printing sheet.

FIG. 2 is a diagram showing a configuration of a color printer of the tandem type. The color printer performs a multi-color printing process. Accordingly, it has a problem that the printing time is long. To solve the problem, a color printer of the tandem type has been proposed. As shown in FIG. 2, the color printer includes, to process images of four colors, four halftone processing sections 26, four pulse width modulation elements 29, four laser diodes 32, and four photosensitive drums 24. The controller concurrently generates CMYK drive pulse signals, color images of four colors are concurrently formed on the four photosensitive drums 24, and then are transferred onto intermediate transfer media 26. Thus, a time taken for the printing by the color printer of this type is shorter than that by the color printer of the type in which the color images are serially formed.

The color printer of the tandem type needs four sets of hardwares. In particular, use of the four pulse width modulation elements 29 is not preferable since it will increase the cost to manufacture. Further, the printer needs the four halftone processing sections 26, and hence, four halftone tables 28. The halftone table 28 is usually formed of a high speed semiconductor memory, such as a static RAM. This fact also increases the cost to manufacture.

SUMMARY OF THE INVENTION

Accordingly, an object of the present invention is to provide a printer which is capable of expressing halftones by a multi-value dither method and reducing the cost to manufacture, and has an optimum configuration.

Another object of the present invention is to provide an image processing device which is capable of expressing halftones by a multi-value dither method and reducing the cost to manufacture, and has an optimum configuration.

According to a broad aspect of the invention, there is provided a printer capable of expressing halftones by forming halftone spots in cells each having a plurality of pixels by irradiating an exposure beam. The printer comprises a halftone processing section for converting M-bit image data into N (M>N)-bit drive pulse width data for driving the exposure beam. The halftone processing section includes a threshold matrix including a plurality of threshold values corresponding to the plurality of pixels, and a converter circuit for comparing each of threshold values output from the threshold matrix with the image data after superposing noise to other of each of threshold values and the image data, to thereby generate drive pulse width data in accordance with the comparison results. Random noise is superposed on the plurality of threshold values or the image data, and the resultant is subjected to the comparison, whereby generation of tone jump is suppressed. The halftone processing section further includes pulse position determining means for determining a position of a drive pulse for a pixel under processing in accordance with drive pulse width data of pixels adjacent to the pixel under processing, and a pulse width modulator for generating a drive pulse signal at the determined drive pulse position according to the drive pulse width data.

The drive pulse width data defining an area of a virtual dot in a pixel is constructed using a less number of bits. As a result, a construction of the pulse width modulator is simplified, and the cost to manufacture is reduced. Further, a resolution of a drive pulse width is decreased. As a result, in the halftone processing section, there is no need of converting M-bit image data into M-bit drive pulse width data. The image data is compared with given threshold values, and drive pulse width data is generated from the comparison result. This possibly leads to cost reduction. By making threshold value sets each consisting of a plurality of threshold values correspond to pixels, the image data may be converted into drive pulse width data according to a desired gamma characteristic.

Since the resolution of a drive pulse width of each pixel is decreased, a resolution of a halftone spot is decreased to thereby generate tone jump or pseudo contour. In the invention, the random noise is superposed on the threshold values or the image data, and those are compare with each other to thereby generate drive pulse width data. The superposing of the random noise suppresses a tone jump and generation of the pseudo contour.

The random noise is superposed on the threshold values or the image data. As a result, virtual dots having a medium density level between a maximum density level and a minimum density level are generated in pixels randomly. An area of the virtual dot of a medium density level is small. Accordingly, dot reproduction is unstable, and randomly performed. Hence, generation of such virtual dots is unpredictable. To cope with this, in the invention, a position of a drive pulse in a pixel under processing is determined according to the drive pulse width of a pixel or pixels adjacent to the pixel under processing. Specifically, a drive pulse is generated at a position in contact with a pixel having a larger drive pulse width. As a result, instability of a fine virtual dot is eliminated.

DETAILED DESCRIPTION OF THE PREFERRED EMBODIMENTS

The preferred embodiment of the present invention will be described with reference to the accompanying drawings. Before proceeding with description, It should expressly be understood that the present invention is not limited to the embodiment to be described hereunder, but may variously be modified, altered and changed within the true spirits and scope of the invention as defined in the appended claims.

Figure 1:
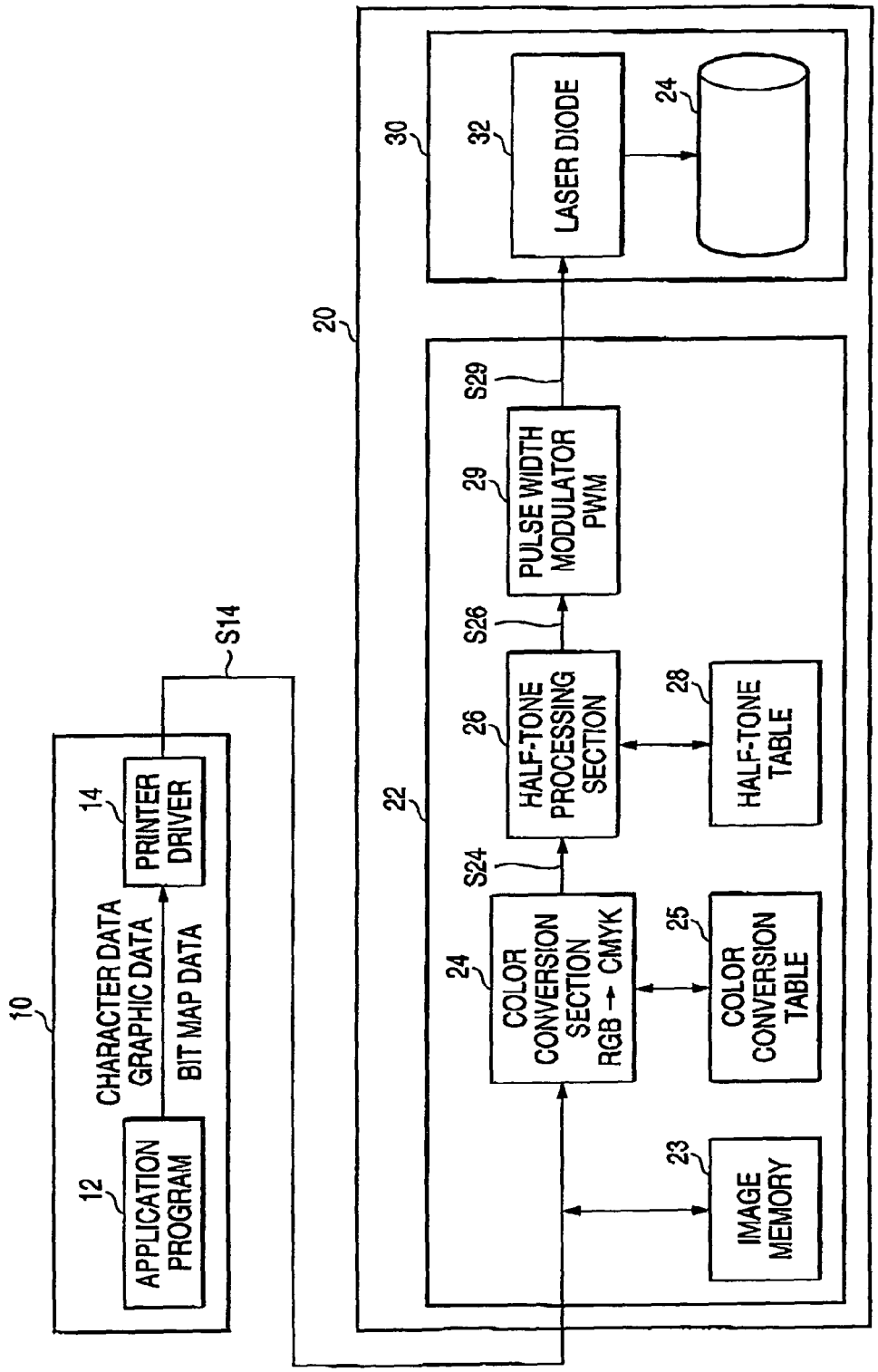
FIG. 1 is a block diagram showing an overall configuration of a conventional printer system.
Figure 2:
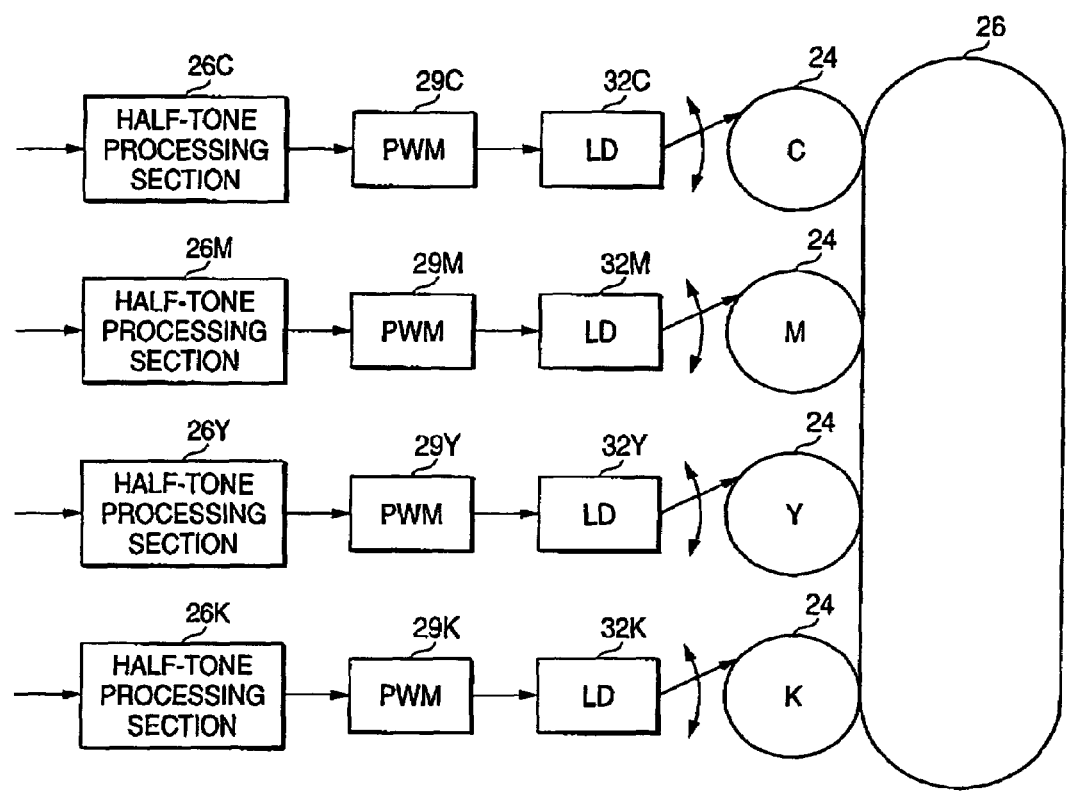
FIG. 2 is a diagram showing a configuration of a color printer of the tandem type.
Figure 3:
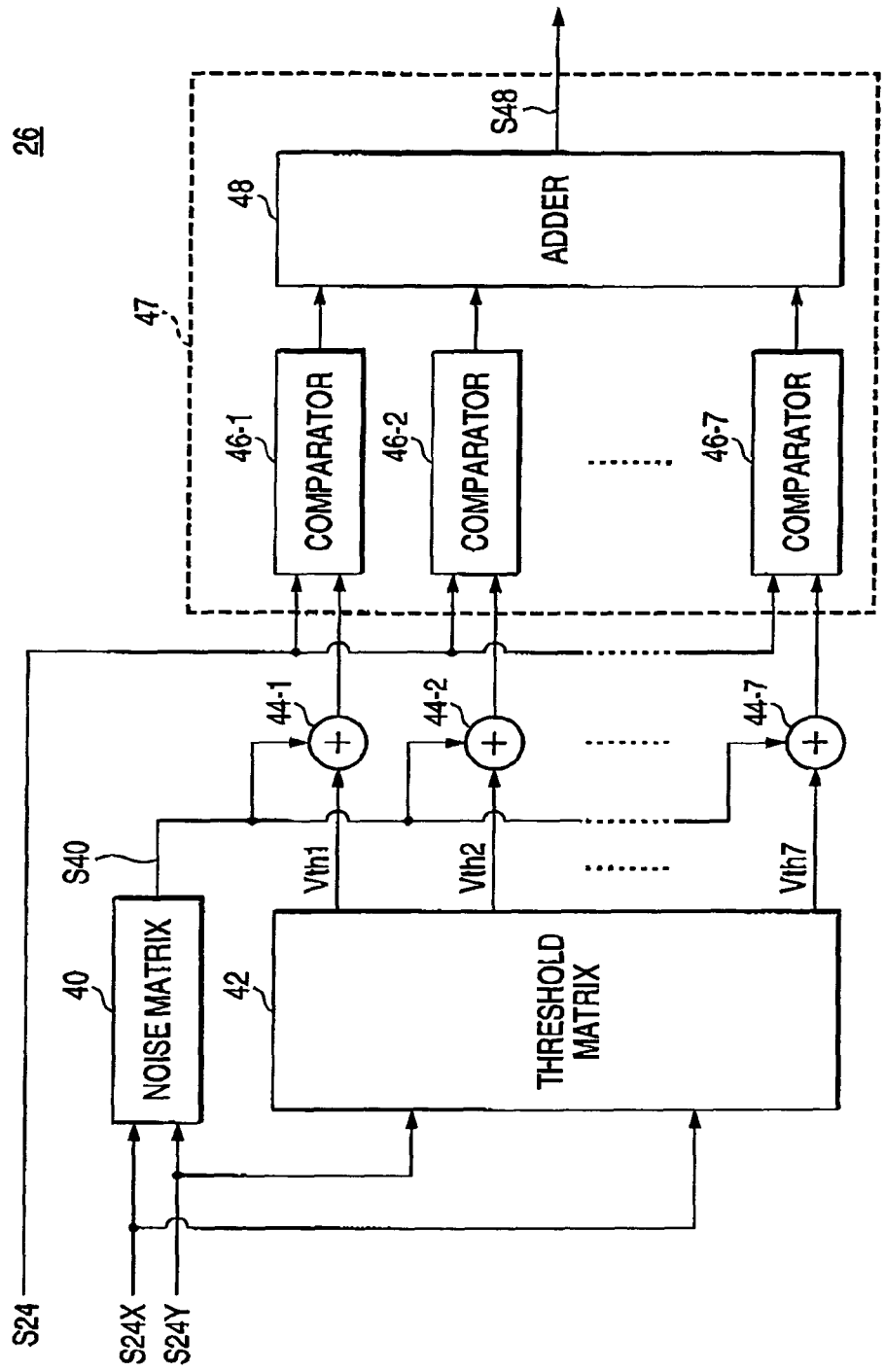
FIG. 3 is a block diagram showing a part of a halftone processing section in an embodiment of the invention.

FIG. 3 is a block diagram showing a part of a halftone processing section in the instant embodiment. The halftone processing section 26 includes a converter circuit 47 for converting 8-bit image data S24 of the pixel into a 3-bit drive pulse width data S48 as image reproduction data. The converter circuit 47 compares the image data S24 with a plurality of threshold values Vth1 to Vth7, and adds together the results of comparisons to thereby generate drive pulse width data 48. Incidentally, the converter circuit is not of the type in which it refers to the halftone table shown in FIG. 1, in the execution of the halftone process.

The halftone processing section of FIG. 3 contains a threshold matrix 42, a noise matrix 40 and adders 44-1 to 447. The threshold matrix 42 produces seven threshold values Vth1 to Vth7 corresponding to a position X and Y of a pixel. The noise matrix 40 likewise produces random noise S40 corresponding to a position X and Y of a pixel. The adders 44-1 to 44-7 add random noise S40 to threshold values Vht1 to Vth7. The threshold values Vht1 to Vth7 on which random noise is superposed, which are output from the adders, are compared with the image data. The random noise S40 may be superposed on the threshold values unless the size of the noise matrix 40 is a multiple of the size of the threshold matrix 42 or a divisor of the same.

It is preferable that the matrix size is selected to such an extent that noise repetitions are observable. In the case of the printer of 600 dpi, the matrix size is preferably 32×32 or larger (about 1.35 mm square or larger)

The converter circuit 47 for converting 8-bit image data into 3-bit drive pulse width data contains comparators 46-1 to 46-7 for comparing the seven threshold values on which the noise is superposed with the image data, and an adder 48 for adding together seven comparison results.

Figure 4:
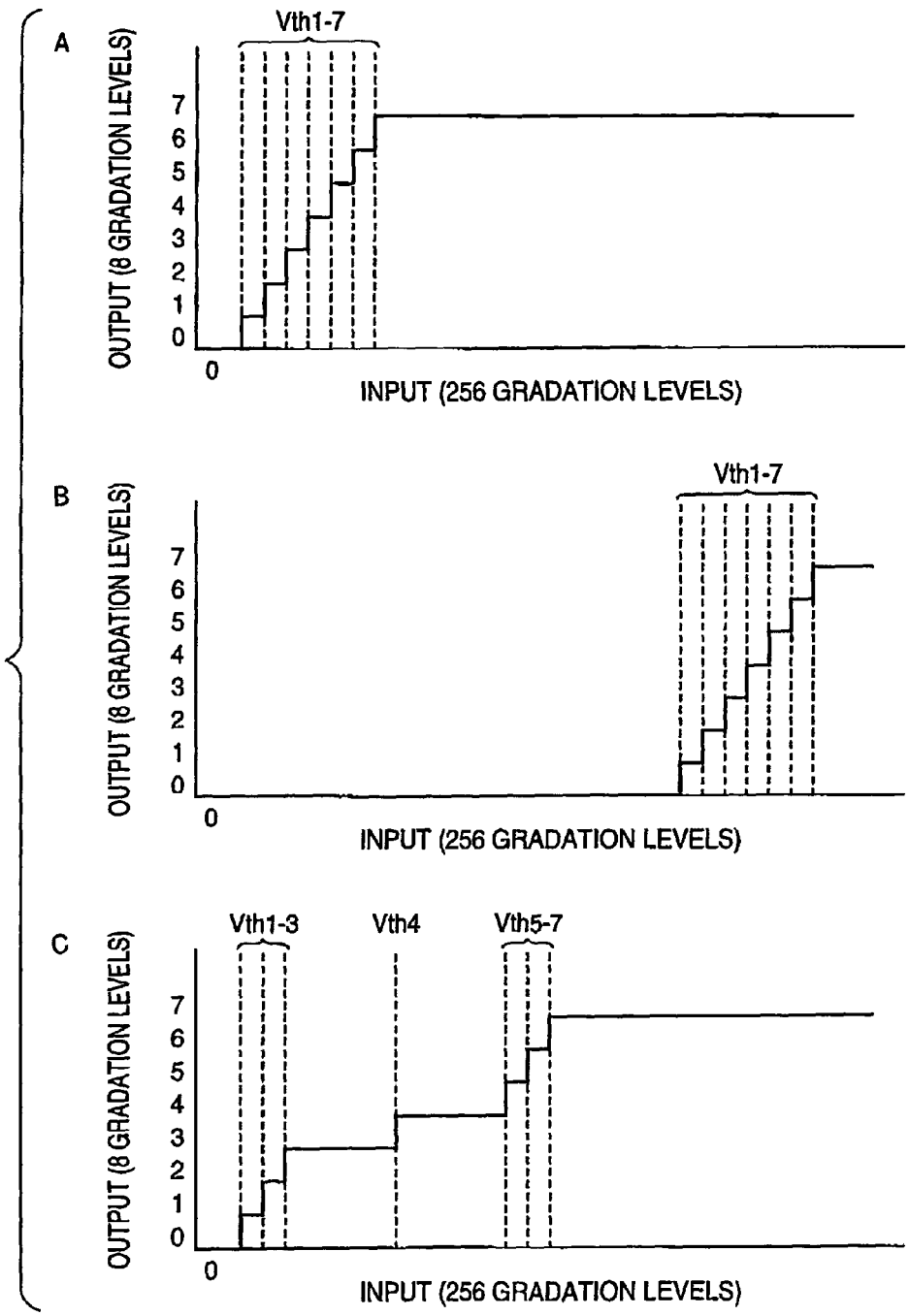
FIG. 4 graphically shows the threshold values and gamma tables of the converter circuit 47 corresponding to the threshold values.

FIG. 4 graphically shows the threshold values and gamma tables of the converter circuit 47 corresponding to the threshold values. Here, the gamma table is a table for converting input image data of 8 bits (256 gradation levels) into the drive pulse width data S48 of 3 bits (8 gradation levels). Accordingly, in FIG. 4, gamma tables (indicated by bold lines) for converting input image data of 256 gradation levels into output data of 8 gradation levels are illustrated with relation to the threshold values Vth1 to Vth7.

In a gamma table A shown in FIG. 4, the threshold values Vht1 to Vth7 are set to be relatively low. When the input image exceeds a threshold value Vth1, a gradation level of the output data increases by one gradation level. When the input image data exceeds the next threshold value Vth2, the gradation level of the output data increases to be the second gradation level. In this way, every time that the input image data exceeds each of the remaining threshold values Vth3 to Vth7, the gradation level of the output data increases by one gradation level. As a result, the input levels of 0 to 255 are converted into output levels of 0 to 7.

In the gamma table A, the threshold values Vht1 to Vth7 are set to be relatively low. Accordingly, when the input level increase, the output level relatively early rises. Describing this in terms of the drive pulse width corresponding to a virtual dot in a pixel, the drive pulse width takes a maximum value in a region where the image data is in a low gradation region, and a virtual dot having a maximum density level is formed in the pixel.

In a gamma table B in FIG. 4, the threshold values Vht1 to Vth7 are set to be relatively high. Since the threshold values are set to be relatively high, when the input level increases, the output level rises relatively late. The drive pulse width data is generated such that no virtual dot is formed in the pixel in a region where the gradation level of the image data is low, while a virtual dot is formed in a region where the gradation level of the image data is high. If the pixels defined by the gamma table A are disposed at the center of the cell, and the pixels defined by the gamma table B are disposed around the former pixels, halftone spots which grow in accordance with gradation levels of the pixels are generated in a cell containing a plurality of pixels.

While the threshold values Vht1 to Vth7 in each of the gamma tables A and B are equidistantly arranged, the threshold values Vht1 to Vth7 in a gamma table C are arranged not equidistantly. Specifically, in the gamma table C, three threshold values Vht1 to Vth3 are arranged at short intervals in a region where the input level is low. One threshold value Vth4 is located at a region where the input level is medium. The remaining three threshold values Vth5 to Vth7 are arranged at short intervals in a region where the input level is relatively high. Therefore, in the gamma table C, the virtual dots in the pixels rapidly grow as the input level increases. A growing velocity of the virtual dot decreases in the region where the input level is medium. In the region where the input level is high, the virtual dot rapidly increases again to have a maximum level. Thus, the gamma table C has an S-characteristic.

As seen, a desired halftone conversion characteristic can be obtained by varying the arrangement of the plurality of threshold values Vth1 to Vth7.

Figure 5:
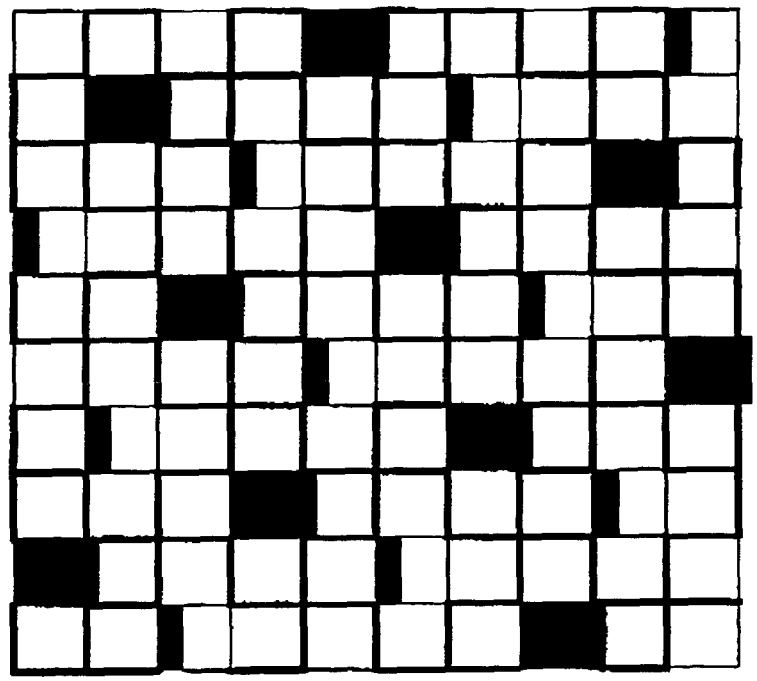
FIG. 5 is a diagram showing a threshold matrix used in the embodiment of the invention and dots grown in cells in the threshold matrix.

FIG. 5 is a diagram showing a threshold matrix used in the embodiment of the invention and dots grown in cells in the threshold matrix. FIG. 5A shows a threshold matrix 42 of 10×10. A threshold value set Vtn (n=1 to 10) consisting of seven threshold values Vth1 to Vth7 is assigned to each pixel of the 10×10 threshold matrix. In the case of FIG. 5, a halftone spot cell for expressing a halftone consists of five pixels arranged in a cross-shaped form. The halftone spot cells contain first halftone spot cells A and second halftone spot cells B. In the first halftone spot cell A, halftone spots are grown from a relatively low gradation level. In the second halftone spot cell B, the halftone spots are grown from a gradation level higher than the corresponding one of the first halftone spot cell A. The first halftone spot cells A are arranged along screen lines inclined at an angle. The second halftone spot cell B are arranged along a screen line between the screen lines of the first halftone spot cells A.

In FIG. 5A, the threshold value sets Vt1 to Vt5 are assigned to the five pixels Vtn(A) forming each first halftone spot cell A, as shown. The threshold value sets Vt6 to Vt10 are assigned to the five pixels Vtn(B) forming each second halftone spot cell B, as shown. Each threshold value set Vtn contains seven threshold values Vth1 to Vth7. Those seven threshold values are appropriately arranged so as to form a desired gamma table, as shown in FIG. 4.

Hereupon, a case where the halftone spot starts to grow at the center pixel of the first halftone spot cell A is assumed. The threshold value set Vt1 located at the center of the first halftone spot cell A is set as the threshold value set which relatively early rises corresponding to the low input level as shown in the gamma table A of FIG. 4. The threshold value sets Vt2 to Vt5 located around the center of the first halftone spot cell A are set as the threshold value sets which rises corresponding to the input level higher than that of the gamma table A. Also in the second halftone spot cell B, the gamma table of the threshold value set Vt6 has characteristics which rises corresponding to the input level lower than that of the gamma tables of the threshold value sets Vt7 to Vt10 for the pixels around the center of the cell. In addition, the gamma table of the Vt6 has characteristics which rises corresponding to the input level higher than that of the gamma table of Vt1 in the first halftone spot cell A.

In this case, for a level of certain input image data, a dot (or a virtual dot) of a maximum density level is formed at the center pixel in the first halftone spot cell A, and a dot of a medium density level is formed at the center pixel in the second halftone spot cell B. In FIG. 5B, there are illustrated dots grown in such cells. As shown, in the first halftone spot cell A, the dot of the center pixel is in the maximum density level, and the dot of the pixel located on the right side thereof is in a medium density level. In the second halftone spot cell B, the dot of the center pixel remains medium in density level.

Returning to FIG. 3, the threshold matrix 42 shown in FIG. 5(A) produces a threshold value set Vtn corresponding to the pixels under processing in accordance with the positions X and Y of the pixels under processing. Noise S40 output from the noise matrix 40 is superposed on the seven threshold values Vht1 to Vth7 forming the threshold value set in the adders 44-1 to 44-7. The comparators 46-1 to 46-7 compare the seven threshold values on which the noise is superposed 24 with input image data S24. When the image data is larger than the threshold value, the comparator outputs a signal of "1". When the former is smaller than the latter, it outputs a signal of "0". The output values of the signals output from the comparators are summed by the adder 48. The adder 48 is a 3-bit counter, for example, and outputs the sum value of 8 gradation levels as the drive pulse width data S48.

The halftone processing section in FIG. 3 compares the threshold values on which the noise randomly generated is superposed with the image data S24. Therefore, the number of bits of the drive pulse width data S48 is reduced by 3 bits. Accordingly, the results of the comparison at the input levels before and after a threshold value vary in value to thereby suppress a tone jump, even if its resolution is correspondingly reduced, and the resolution on the area the halftone spot is also reduced.

The noise may be superposed on the input image data, not the threshold values. In the embodiment, the random noise is superposed not on the image data, but on the threshold values. Accordingly, the adders 44-1 to 44-7 for superposing the noise add the noise of the limited amplitude to the known threshold values. Accordingly, generation of the carry (or borrow) of the adder is avoided. The construction of the adders 44-1 to 44-7 is simplified so much, and this leads to cost reduction.

In case where the noise is superposed on the image data S24, the image data is unknown in its value and unpredictable. Therefore, some measure must be taken for the carry (or borrow) of the adders. Accordingly, the cost to manufacture is increased by the cost for the measure taken. Specifically, where the image data is 0 to 255 in gradation level, when the noise is added to the image data and resultantly the gradation level is smaller than 0 or exceeds 255, the addition result must be corrected to 0 or 255. To this end, some means for such a correction must additionally be provided.

While in the embodiment mentioned above, the noise matrix is used for generating the noise, it may be substituted by a pseudo random number generation circuit. In this case, any of the following noise generation methods may be used: midsquare method, mixed linear congruence method, Lagged Fibonacci gneration method, Knuth's algorithm (e.g., "The art of computer programming", 3rd edition, (1997)", a method using a Mersenne primes, and a method using a well known M series or Gold pseudo-random number sequence or the like. When considering the size of such random number generation circuits, use of other methods than midsquare method, mixed linear congruence method, or the like, which uses the multiplication, are preferable. In particular, use of the random number generation method by the M series which may be constructed using the shift register is preferable in that it is easy to express it in terms of circuit, the resultant circuit is small in size, and noise repetitions are observable since a period of random numbers is long. In a general example of the random number generation which uses the characteristic equation $f(x)=x^{31}+z^2+1$, the noise generation circuit may be constructed with a 3-bit shift register and one exclusive OR circuit. For details of an M-series basis random number generation method, reference is made to "Japanese volume of Transactions of the SICE, volumes 2 to 4, pp 83-288, 1966" or the like.

A technique for making the tone jump unobservable by the addition of the random noise is disclosed in U.S. Pat. No. 4,245,258, for example. The related image processing technique handles only generation of binary data, viz., a dot is formed in the pixel or it is not formed therein. That is, this image processing technique is a halftone processing technique by using the two-value dither method.

In case where the multi-value drive pulse width data is generated to multi-value an area of the dot in the pixel as in the instant embodiment, it is necessary to determine a drive pulse position for specifying a position of the virtual dot in the pixel in addition to the drive pulse width data for specifying the size of a virtual dot in the pixel. In particular, when the image is halftoned by adding the random noise, the virtual dot does not grow according to the designed characteristic of the threshold matrix 42 regularly, and the virtual dots in the pixels inclusive of the virtual dots in the adjacent pixels are randomly generated, and hence, it is impossible to predict the generation of the virtual dots. For this reason, it is impossible to more stably position the virtual dots according to the halftone conversion characteristic in advance.

Figure 6:
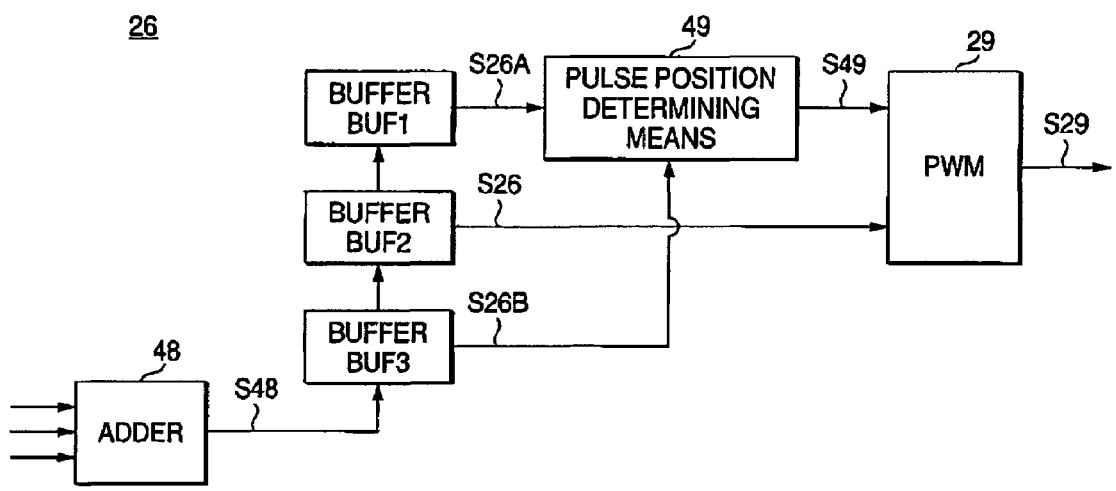
FIG. 6 is a block diagram showing the remaining portion of the halftone processing section in the embodiment.

To cope with this, the embodiment determines a position of a drive pulse for a pixel under processing, while referring to the drive pulse width data of the adjacent pixels. FIG. 6 is a block diagram showing the remaining portion of the halftone processing section in the embodiment. In FIG. 6, there is shown a circuit for determining a drive pulse position in the halftone processing section. In the drive pulse position determining circuit, the 3-bit drive pulse width data S48 output from the adder 48 of the converter circuit is successively stored in buffers BUF1, 2 and 3. The drive pulse width data S26A and S26B are input from the buffers BUF 1 and 3 to pulse position determining means 49. And, the drive pulse is determined to be positioned at the larger data of those pieces of the drive pulse width data. Pulse position information S49 output from the pulse position determining means 49 and the drive pulse width data S26 of the pixel under processing are supplied to the pulse width modulation circuit 29, which in turn produces a drive pulse signal S29 which is to be positioned according to the pulse position information S49 and has a pulse width defined by the drive pulse width data S26.

Figure 7:
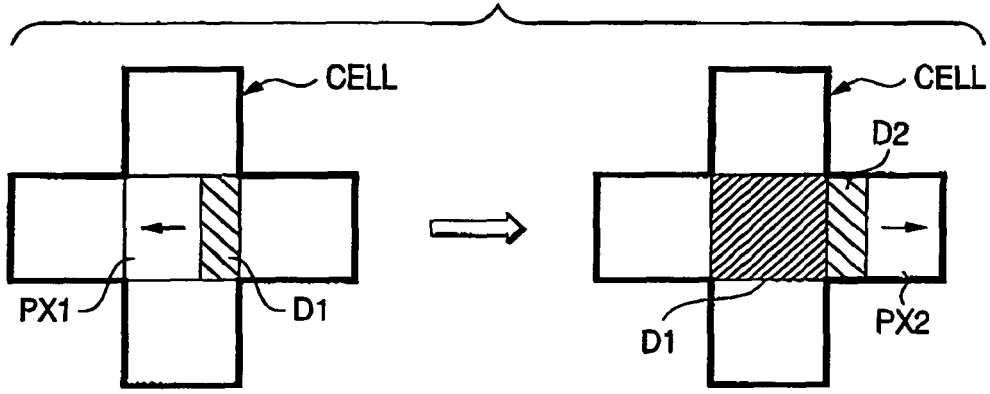
FIG. 7 is a diagram useful in explaining a position determining algorithm in the pulse position determining means.
Figure 7:
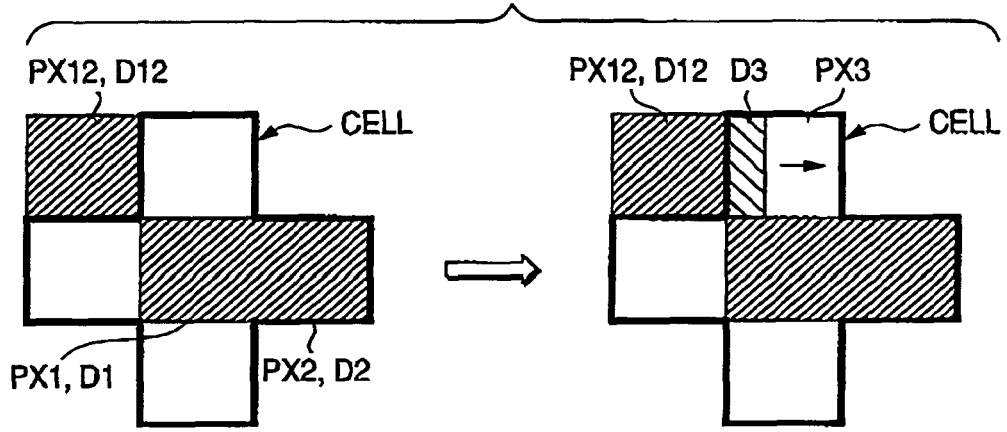
Figure 7:
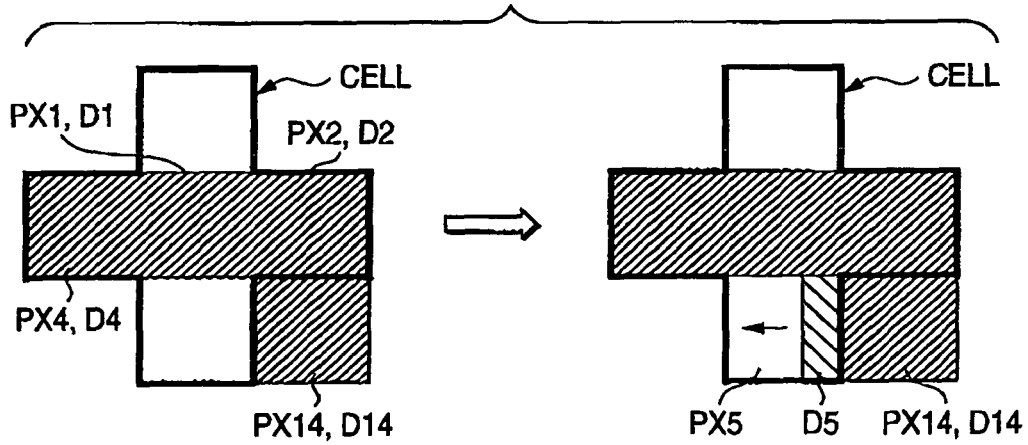

FIG. 7 is a diagram useful in explaining a position determining algorithm in the pulse position determining means. FIG. 7 shows three exemplary algorithms (A), (B) and (C). In a case of FIG. 7A, a virtual dot D1 is growing in a pixel PX1 in a left-side cell CELL consisting of five pixels arranged in a cross-shape. As the input level increases, the virtual dot D1 grows in a direction of an arrow, and finally the virtual dot D1 of a maximum density level is formed in the pixel PX1. In a right-side cell, the virtual dot D1 has been grown to have a maximum density level and another virtual dot D2 is growing in its adjacent pixel PX2. The virtual dot D2 is determined to be positioned at the pixel PX1 where the virtual dot D1 having the maximum density level has been grown, by comparing the sizes of the virtual dots on both sides of the pixel PX2. As a result, even if the virtual dot D2 is very small, there is no chance that the virtual dot D2 unstably grows, and toner unstably attaches to the virtual dot, and a dot is unstably developed, since the virtual dot D2 is grown in contact with the large virtual dot D1 in its adjacent pixel PX1.

In FIG. 7B, virtual dots D1 and D2 have been grown to have a maximum density level in two pixels PX1 and PX2 of a cell CELL, and another virtual dot D3 starts to grow anew in a pixel PX3. A pixel PX12 is adjacent to the left side of the pixel PX3. A virtual dot D12 having a maximum density level has been generated in the pixel PX12. Accordingly, according to the algorithm mentioned above, the virtual dot D3 of the pixel PX3 is determined to be positioned at the adjacent pixel PX12. As a result, the virtual dot D3 grows in contact with the adjacent dot D12 of the maximum density level, and the growing is never unstable.

In FIG. 7C, the virtual dots have grown to have a maximum density level in three pixels PX1, PX2 and PX3 in the cell CELL, and another virtual dot D5 starts to grow anew in a pixel PX5. In this case, a virtual dot D14 has grown to have a maximum density level also in a pixel PX14 of its adjacent cell PX14. Accordingly, the virtual dot D5 growing anew in the pixel PX5 is determined to be positioned at the right-side cell.

As described above, in the pulse position determining means in FIG. 6, the drive pulse widths (virtual dot sizes) of the pixels located on both sides of a pixel are compared, and of those adjacent pixels, the pixel having the larger drive pulse width is determined to be the drive pulse position (virtual dot position), thereby avoiding such a situation that a small virtual dot starting its growth is unstable.

The configuration of FIG. 6 contains the pulse width modulation element 29. It is satisfactory that the pulse width modulator 29 is able to generate a drive pulse signal from the drive pulse width data S26 of 3 bits. Accordingly, the pulse width modulator 29 of the embodiment may be constructed with a simple logic circuit, when comparing with the circuit for generating a drive pulse signal having the resolution of 256 from the 8-bit drive pulse width data the pulse width modulator 29 may be fabricated into a system LSI containing the halftone processing section, thereby leading to cost reduction.

As described above, the position of the virtual dot is determined by the drive pulse width data of the pixels located on both sides of a pixel under processing in the embodiment mentioned above. For the same purpose, data on eight pixels located around a pixel under processing may be referred to. In another virtual dot position determining method, a less number of pixels is referred to. For example, only one of the pixels located on both sides of the pixel under processing is referred to. In the determining method in which the eight peripheral pixel data are referred to, even if the data of both-side pixel data are equal, the upper and lower pixels on the left or right side of the pixel under processing are referred to, thereby determining a position of the virtual dot so that the dot is more stable. In another determining method, when one-side pixel, e.g., a pixel processed just before the pixel under processing, specifically, only the data of a left-side pixel is referred to, when a raster scan is performed from the left upper side to the right lower side. In this case, if the left-side pixel has a predetermined value or larger, the pixel is shifted to the left side. If the left-side pixel has a value smaller than a predetermined value, the pixel is shifted to the right side. In a further determining method, if a virtual dot position of a pixel on the left side is shifted to the right side, the virtual dot of the pixel under processing is shifted to the left side. In this case, the circuit construction is simplified.

Firstly, the halftone processing section of the embodiment generates drive pulse width data halftone processed by superposing the random noise onto the threshold values and comparing them, compares the drive pulse width data of the pixels on both sides of a pixel under processing, and selects one pixel having larger data than the other or the pixel having a maximum density level for the drive pulse position of the pixel under processing. As a result, the virtual dot position is set at an appropriate position, while monitoring both-side pixels irregularly generated by the noise.

Secondly, the random noise is superposed on the threshold values, not on the image data of the pixel. In this case, the circuit construction of the adder 44 is simplified by selecting the threshold values so that no carry is generated in the adder 44.

Figure 8:
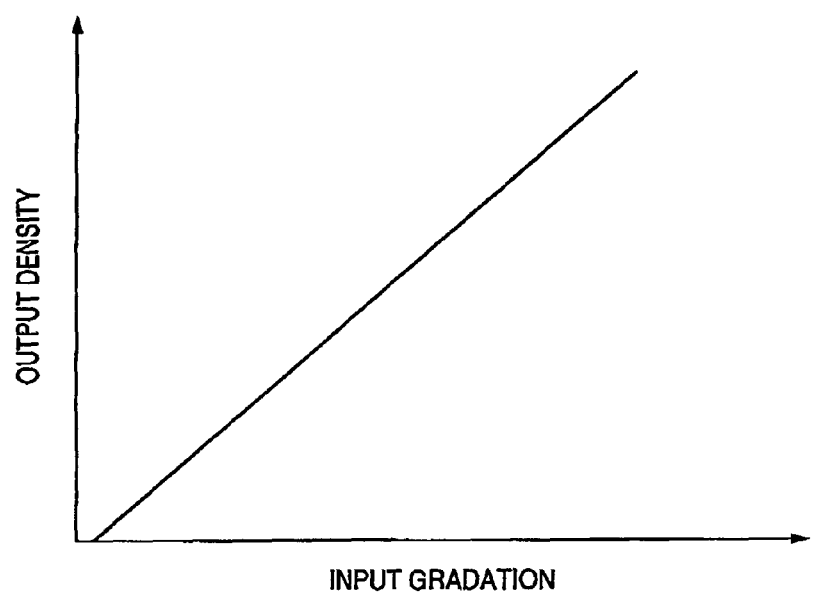
FIG. 8 graphically represents relations of the output density and the output gradation to the input gradation in a preferred embodiment.
Figure 8:
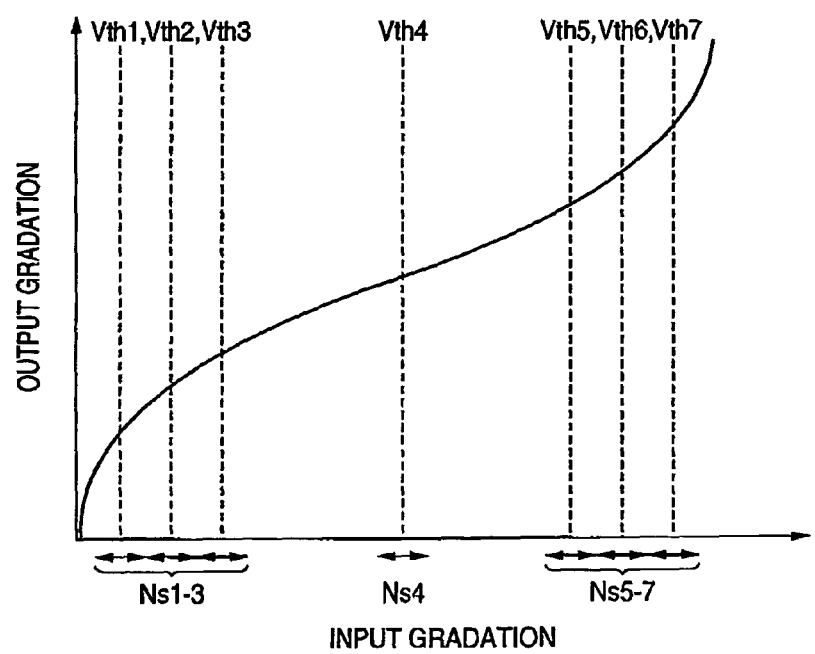

An S-curve characteristic is used for the high frequency conversion characteristic of the output gradation to the input gradation in order that an output density of a generated image is proportional to an input gradation of the image data of the pixel as an input to the halftone processing section. FIG. 8 graphically represents relations of the output density and the output gradation to the input gradation in a preferred embodiment. FIG. 8A is a graph showing a relation between the output density and the input gradation. As seen, the output density increases proportional to the input gradation. The output density is an optical characteristic of an image formed by attaching toner to the virtual dot. It is not always proportional to the area of the halftone spot in the sense of the visual characteristic.

FIG. 8B is a graph showing a relation between the input gradation and the output gradation to realize the characteristic of FIG. 8A. In a gradation region where the input gradation is near zero (0), the output gradation must sharply be increased, and also in a gradation region where the input gradation is near a maximum value, the output gradation must sharply be increased. To obtain such a characteristic as shown in FIG. 8B, the threshold values Vht1 to Vth7 are arranged at narrow intervals in the low and high gradation regions, and those must be arranged at wide intervals. Thus, the seven threshold values Vht1 to Vth7 are arranged not equidistantly.

In the embodiment, as shown in FIG. 3, the same noise S40 is superposed on the seven threshold values Vht1 to Vth7. That is, the noise S40 of the equal amplitude is added to the threshold values independently of the density regions. In the technique of U.S. Pat. No. 4,245,258 already referred to, the maximum amplitude of the noise is set according to the intervals of the threshold values. In this methodological technique, if the intervals of the threshold values are irregular, the amplitude of the noise is excessively large in part of the density region, and the noise is observable in that density region. To avoid this, in the instant embodiment, the same noise is applied to the plurality of threshold values.

In some types of printers, a plurality of halftone spot screens having the different numbers of screen lines, which are provided for characters and photograph, are used, and those halftone spot screens are selectively used in accordance with a print object. For such a printer, it is desirable to vary the amplitude of the noise in accordance with the number of screen lines. When the number of screen lines is small, halftone spot reproducibility is high, and the noise applied is observable. For this reason, when the number of screen lines is small, the amplitude of the noise is selected to be smaller than that when the number of screen lines is large.

Figure 9:
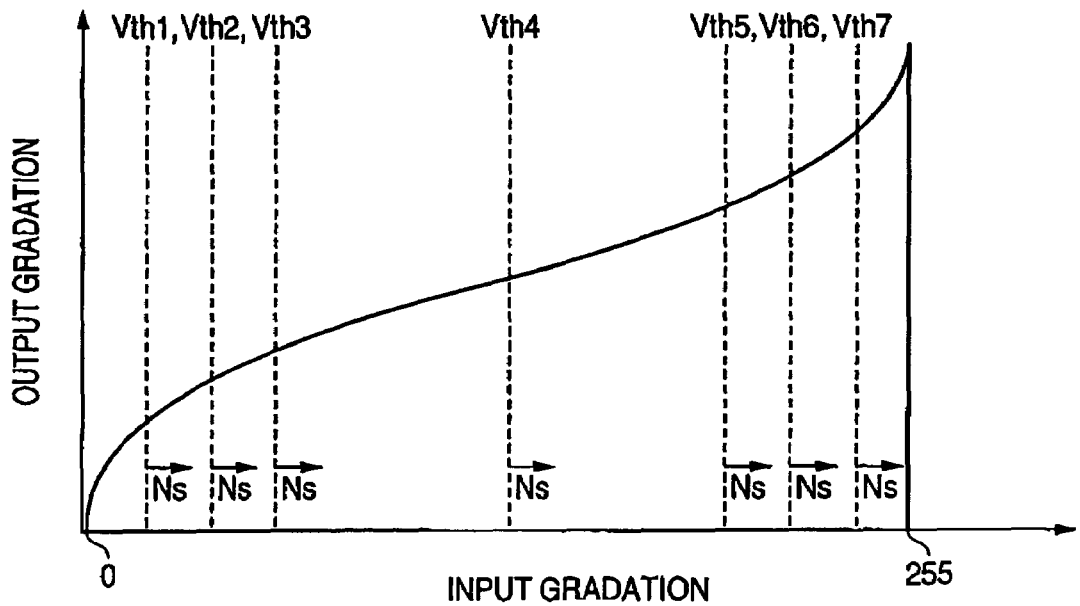
FIG. 9 graphically represents a relation between the threshold value and the noise in the embodiment.

FIG. 9 graphically represents a relation between the threshold value and the noise in the instant embodiment. Specifically, in FIG. 9, there is illustrated a relation between the input gradation and the output gradation. To realize the S-curve characteristic, the seven threshold values Vht1 to Vth7 are set as shown. In the instant embodiment, positive noise Ns is applied to liquid level the threshold values Vht1 to Vth7. With the application of the positive noise Ns, the adder 44 may be constructed with a simple circuit which is operable for performing only the positive addition operation. Further, it is prevented that a pixel of a minimum input gradation (gradation value=0) representing white changes its color to gray under influence of the noise, since the noise is always positive. In the embodiment, to prevent the pixel of a maximum input gradation representing black (or each color) (gradation value=255) from changing to gray by the noise, the highest threshold value Vth7 is set to be lower than the maximum value 255 by a maximum amplitude of the noise Ns. By so setting, it is prevented that the threshold value Vth7 exceeds a maximum gradation value, the pixel having a maximum density level is surely formed in the pixel having a maximum input gradation. The addition result of the adder 44 can be handled by 8 bits without a carry. The adder may be constructed with a simple circuit with no carry.

Figure 10:
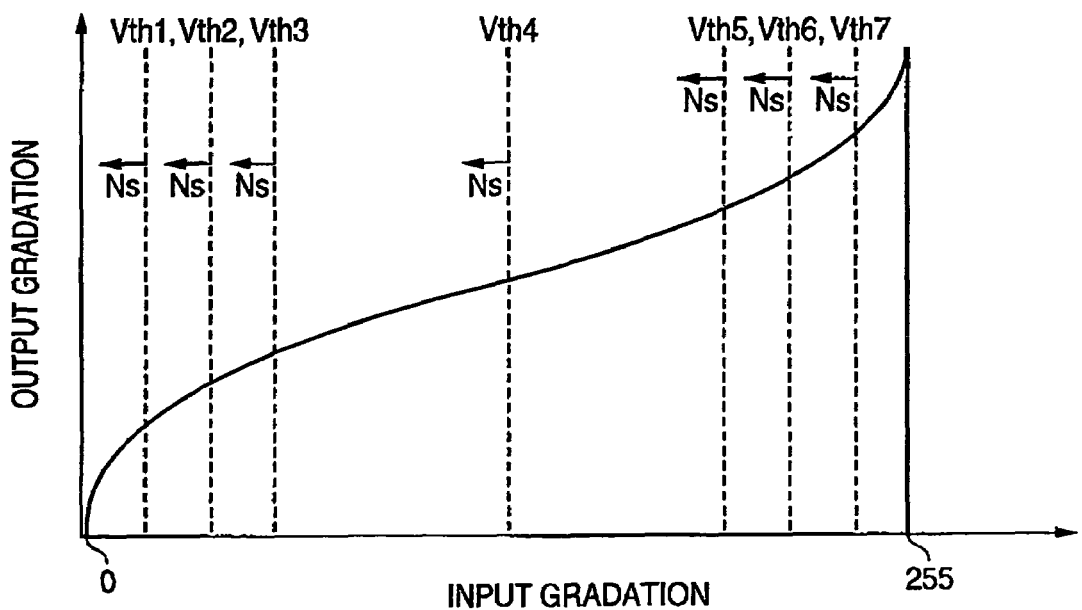
FIG. 10 graphically represents another relation between the threshold value and the noise in the embodiment.

FIG. 10 graphically represents another relation between the threshold value and the noise in the embodiment. FIG. 10 is in reverse relation to FIG. 9. That is, the noises Ns applied to the threshold values are all negative. Therefore, a virtual dot of a maximum density is always generated in a pixel of a maximum input gradation. The smallest threshold value Vth1 is set at a value larger than a maximum amplitude of the noise Ns. Therefore, it is prevented that the negative noise Ns is applied to the threshold value and the threshold value Vth1 to be compared is negative, and that a gray virtual dot is formed in a white pixel.

While in the embodiment, the invention has been described by using the printer utilizing the laser beam, it will readily be understood that the invention may be applied to a printer using the line head including light emitting elements (LEDs). In the case of the line head, the drive pulse is modulated in a sub-scan direction (vertical direction on the image), not in the main scan direction (horizontal direction on the image). The both-side virtual dots which are referred to in determining the drive pulse position are the pixels located above and below the pixel under processing, not the pixels located on the right and left sides of the pixel under processing. Further, the present invention may be applied to a printer which expresses the image data in multi-values by using the pulse width modulation, such as a thermal printer or a thermal transfer printer.

As seen from the foregoing description, in the printer of the invention, the pulse width modulation circuit for modulating the drive pulse width data into a drive pulse signal is simplified to thereby realize the reduction of cost to manufacture. Additionally, even when the noise is superposed on the image data to suppress the tone jump, the drive pulse is set at an appropriate position.

What is claimed is:

1. A printer forming halftone spots in cells each having a plurality of pixels by irradiating an exposure beam, said printer comprising:
    a halftone processor for converting M-bit image data into N (M>N)-bit drive pulse width data for driving said exposure beam, said halftone processor including:
    a threshold matrix including a plurality of threshold values corresponding to said plurality of pixels;
    a converter circuit for comparing said each of threshold values output from said threshold matrix with said image data after superposing noise to one of said each of threshold values and said image data, to thereby generate drive pulse width data in accordance with said comparison results; and
    a pulse position determining circuit for determining a position of a drive pulse for a pixel under processing in accordance with drive pulse width data of pixels adjacent to said pixel under processing;
    wherein a drive pulse signal is generated at said determined drive pulse position according to said drive pulse width data.

2. A printer according to claim 1, wherein said converter circuit superposes noise on said plurality of threshold values, and compares said plurality of threshold values on which said noise is superposed with said image data.

3. A printer according to claim 2, wherein said plurality of threshold values are arranged at irregular intervals and a noise is superposed on said plurality of threshold values.

4. A printer according to claim 2, wherein said converter circuit includes adders for adding said noise to said plurality of threshold values output from said threshold matrix, wherein the threshold values of said threshold matrix are selected such that neither carry nor borrow is generated in said adders.

5. A printer according to claim 4, wherein said noise is a positive noise, and a maximum threshold value output from said threshold matrix is selected to be equal to or smaller than a value resulting from a subtracting operation of a maximum amplitude of said noise from a maximum value of said image data.

6. A printer according to claim 4, wherein said noise is a negative noise, and a minimum threshold value output from said threshold matrix is selected to be equal to or larger than a value resulting from an adding operation of a maximum amplitude of said noise to a minimum value of said image data.

7. A printer according to claim 1, wherein said adjacent pixels are a plurality of pixels around said pixel, right and left pixels of said pixel, or a pixel processed just before said pixel under processing.

8. A printer forming halftone spots in cells each having a plurality of pixels by irradiating an exposure beam, said printer comprising:
    a halftone processor for converting M-bit image data into N (M>N)-bit drive pulse width data for driving said exposure beam, said halftone processor including:
    a threshold matrix including a plurality of threshold values corresponding to said plurality of pixels; and
    a converter circuit for comparing said each of threshold values output from said threshold matrix with said image data after superposing noise to said each of threshold values output from said threshold values and for generating drive pulse width data in accordance with said comparison results;
    wherein said plurality of threshold values are arranged at irregular intervals, and
    wherein said converter circuit includes adders for adding said noise to said plurality of threshold values output from said threshold matrix, wherein the threshold values of said threshold matrix are selected such that neither carry nor borrow is generated in said adders.

9. A printer according to claim 8, wherein said noise is a positive noise, and a maximum threshold value output from said threshold matrix is selected to be equal to or smaller than a value resulting from a subtracting operation of a maximum amplitude of said noise from a maximum value of said image data.

10. A printer according to claim 8, wherein said noise is a negative noise, and a minimum threshold value output from said threshold matrix is selected to be equal to or larger than a value resulting from an adding operation of a maximum amplitude of said noise to a minimum value of said image data.

11. An image processing device forming halftone spots in cells each having a plurality of pixels, said image processing device comprising:
    a halftone processor for converting M-bit image data into N (M>N)-bit drive pulse width data for driving said exposure beam, said halftone processor including:
    a threshold matrix including a plurality of threshold values corresponding to said plurality of pixels;
    a converter circuit for comparing said each of threshold values output from said threshold matrix with said image data after superposing noise to one of said each of threshold values and said image data, to thereby generate drive pulse width data in accordance with said comparison results; and
    a pulse position determining circuit for determining a position of a drive pulse for a pixel under processing in accordance with drive pulse width data of pixels adjacent to said pixel under processing;
    wherein a drive pulse signal is generated at said determined drive pulse position according to said drive pulse width data.

* * * * *